(12) United States Patent
Dubs

(10) Patent No.: US 9,927,257 B2
(45) Date of Patent: Mar. 27, 2018

(54) METHOD, APPARATUS, AND SYSTEM FOR INITIALIZING A METER READING DEVICE

(71) Applicant: SENSUS SPECTRUM, LLC, Raleigh, NC (US)

(72) Inventor: Justin Dubs, Raleigh, NC (US)

(73) Assignee: SENSUS SPECTRUM, LLC, Raleigh, NC (US)

( * ) Notice: Subject to any disclaimer, the term of this patent is extended or adjusted under 35 U.S.C. 154(b) by 164 days.

(21) Appl. No.: 14/516,297

(22) Filed: Oct. 16, 2014

(65) Prior Publication Data

US 2016/0109263 A1  Apr. 21, 2016

(51) Int. Cl.
| | |
|---|---|
| *G01R 31/08* | (2006.01) |
| *G01D 4/00* | (2006.01) |
| *G06K 9/46* | (2006.01) |
| *G06K 9/78* | (2006.01) |
| *G08C 17/02* | (2006.01) |
| *H04N 7/18* | (2006.01) |
| *G06K 9/00* | (2006.01) |
| *G06K 9/22* | (2006.01) |

(52) U.S. Cl.
CPC ......... *G01D 4/004* (2013.01); *G06K 9/00624* (2013.01); *G06K 9/4604* (2013.01); *G06K 9/78* (2013.01); *G08C 17/02* (2013.01); *H04N 7/181* (2013.01); *G06K 9/22* (2013.01); *G06K 2209/01* (2013.01); *G06K 2209/03* (2013.01); *Y02B 90/242* (2013.01); *Y04S 20/322* (2013.01)

(58) Field of Classification Search
CPC .... G01R 31/025; G01R 31/08; G01R 31/088; G01R 31/083

USPC ..... 324/522, 523, 512; 361/56, 57, 65, 91.1, 361/93.1

See application file for complete search history.

(56) References Cited

U.S. PATENT DOCUMENTS

| | | | | |
|---|---|---|---|---|
| 6,738,693 | B2 * | 5/2004 | Anderson | G01R 21/133 700/291 |
| 7,548,223 | B2 * | 6/2009 | Brooksby | G01D 4/004 340/870.1 |
| 8,737,493 | B2 * | 5/2014 | Borisov | H04B 3/546 324/522 |
| 9,046,390 | B2 * | 6/2015 | Lye | H04Q 9/00 |
| 2002/0077729 | A1 * | 6/2002 | Anderson | G01R 21/133 700/291 |
| 2005/0246295 | A1 * | 11/2005 | Cameron | G01D 4/004 705/412 |

(Continued)

FOREIGN PATENT DOCUMENTS

WO  WO2013136295  * 7/2013 ............ G01D 4/00

OTHER PUBLICATIONS

International Search Report dated Dec. 18, 2015 in Corresponding PCT/US15/50905 filed Sep. 18, 2015.

*Primary Examiner* — Tung X Nguyen
*Assistant Examiner* — Dominic Hawkins
(74) *Attorney, Agent, or Firm* — Olive Law Group, PLLC

(57) ABSTRACT

A method of initializing a meter reading device that communicates a current meter value of a meter to a central metering facility includes capturing, by a camera, an optical image of the meter that displays meter information and determining an initial meter value from the meter information in the optical image of the meter. The method further includes initializing the meter reading device using the initial meter value.

26 Claims, 3 Drawing Sheets

(56) References Cited

U.S. PATENT DOCUMENTS

| | | | |
|---|---|---|---|
| 2007/0057814 A1* | 3/2007 | Goldberg | G01D 4/002 340/870.02 |
| 2009/0146838 A1* | 6/2009 | Katz | G01D 4/006 340/870.02 |
| 2009/0322884 A1* | 12/2009 | Bolick | G01D 4/008 348/160 |
| 2012/0001768 A1* | 1/2012 | Radosavljevic | H04Q 9/00 340/870.03 |
| 2012/0197552 A1* | 8/2012 | Robinson | G01D 4/002 702/50 |
| 2013/0300577 A1 | 11/2013 | Cumeralto et al. | |
| 2014/0340237 A1* | 11/2014 | Kuniyoshi | G01D 4/004 340/870.02 |
| 2014/0362486 A1* | 12/2014 | O'Regan | H02H 3/10 361/87 |

\* cited by examiner

METHOD, APPARATUS, AND SYSTEM FOR INITIALIZING A METER READING DEVICE

BACKGROUND

Technical Field

The present invention relates to initializing an automated meter reading device, and more particularly to automatically providing an initial meter value to the automated meter reading device.

Discussion of the Related Art

The "background" description provided herein is for the purpose of generally presenting the context of the disclosure. Work described herein, to the extent it is described in this background section, as well as aspects of the description which may not otherwise qualify as prior art at the time of filing, are neither expressly or implicitly admitted as prior art.

A customer's consumption of electricity, gas, and/or water is measured by meters which have been installed at the customer's house. For example, the electricity meter measures the amount of electricity (i.e., power) used by the household and the consumption of electric power is indicated by readings on an electricity meter. Similarly, a gas meter measures the amount of gas used by the customer and the consumption of gas is indicated by readings on a gas meter. To bill the customer, the corresponding utility requires two values: an initial meter value on the index of the meter and a usage amount measured since initialization, so that the measured usage amount may be added to the initial meter value.

To reduce costs and enhance billing efficiency and accuracy, many utility companies are investigating and implementing automated meter reading capabilities that automatically report a meter value to a remote location (e.g., a remote utility facility). For example, background automated meter reading solutions sense the current meter reading by physically coupling a sensing device to the rotation of the display dials, magnetically coupling the sensing device to the meter, or electrically coupling the sensing device to an LCD or other type of display.

However, in order for a conventional automated meter reading device to be initialized and an initial meter value to be determined, for example upon installation, a field technician may manually read the initial value of the meter and input this value to the automated meter reading device. This is a slow and error-prone process, as the value reading often includes interpreting a series of dials, each of which has a hand that points to a corresponding digit. Furthermore, the movement direction of the dials may vary between clockwise and counter-clockwise directions of rotation. For example, the dials may alternate between:

1. Digits 0 through 9, with 0 at the top, and the digits proceeding around the dial in a clock-wise fashion. The "value" of the dial increases as the hand rotates in the same direction as an analog clock; and
2. Digits 0 through 9, with 0 at the top, and the digits proceeding around the dial in a counter-clock-wise fashion. The "value" of the dial increases as the hand rotates in the opposite direction of an analog clock.

As such, an erroneous initial meter value reading is possible when such a reading is manually entered by a field technician. An incorrectly entered initial reading may prevent the utility company from accurately billing the customer, leading to billing disputes and customer dissatisfaction.

SUMMARY

Accordingly, one object of the present invention is to solve the above-noted and other problems.

Another object of the present invention is to provide a novel method, system, and apparatus for initializing a meter reading device with increased speed and accuracy.

Still another object of the present invention is to provide a novel method, system, and apparatus for initializing a meter reading device without requiring a field technician to manually read an initial meter value and manually enter the initial meter value into the meter reading device.

To achieve these and other objects, one embodiment of the present invention is a novel method of initializing a meter reading device that communicates a current meter value of a meter to a central metering facility. The method includes capturing, by a camera, an optical image of the meter that displays meter information and determining an initial meter value from the meter information in the optical image of the meter. Finally, the method includes initializing the meter reading device using the initial meter value.

Another embodiment of the present invention is a novel apparatus for initializing a meter reading device, the meter reading device configured to communicate a current meter value of a meter to a central metering facility. In this embodiment, the apparatus includes a camera to capture an optical image of the meter that displays meter information. The apparatus also includes a processor that determines an initial meter value from the meter information in the optical image of the meter and initializes the meter reading device using the initial meter value.

Yet another embodiment of the present invention is a novel system for initializing a meter reading device. The system includes the meter reading device that communicates a current meter value of a meter to a central metering facility and an initialization apparatus including a camera to capture an optical image of the meter that displays meter information. The initialization apparatus also includes a processor that determines an initial meter value from the meter information in the optical image of the meter and initializes the meter reading device using the initial meter value.

Another embodiment of the present invention is a novel apparatus for initializing a meter reading device, the meter reading device configured to communicate a current meter value of a meter to a central metering facility. In this embodiment, the apparatus includes a camera to capture an optical image of the meter that displays meter information. The apparatus also includes a processor that transmits the optical image of the meter to a server, receives, from the server, an initial meter value determined from the meter information in the optical image of the meter, and initializes the meter reading device using the initial meter value.

BRIEF DESCRIPTION OF THE DRAWINGS

A more complete understanding of the disclosure may be attained by reference to the drawings, in which.

DETAILED DESCRIPTION

Figure 1:
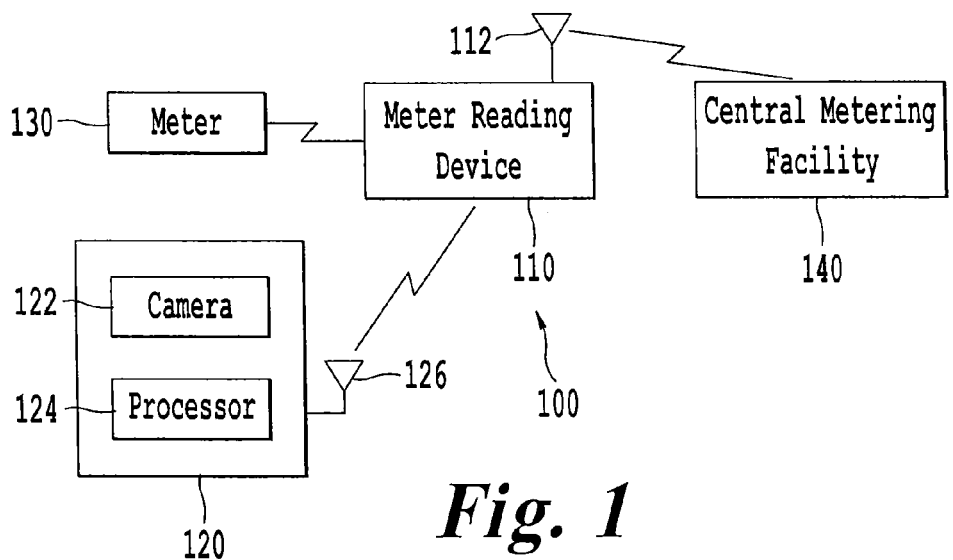
FIG. 1 shows an exemplary system for initializing a meter reading device is used.

Like reference numerals in the drawings and the description thereof designate identical or corresponding parts/steps throughout the several views. Any processes, descriptions or blocks in flow charts or functional block diagrams should be understood as representing modules, segments, portions of code which include one or more executable instructions for implementing specific logical functions or steps in the processes/algorithms described herein, and alternate implementations are included within the scope of the exemplary embodiments of this disclosure in which functions may be executed out of order from that shown or discussed, including substantially concurrently or in reverse order, depending upon the functionality involved.

FIG. 1 is a block diagram of a system 100 for initializing a meter reading device 110. The system 100 includes the meter reading device 110 (e.g., an automated meter reading device that automatically reports meter readings to a remote location) and an initialization apparatus 120 capable of communicating with the meter reading device 110. The meter reading device 110 is associated with a meter 130. The meter reading device 110 is capable of automatically reading a current measured value (e.g., measured power/electricity, water volume, etc . . . ) from the meter 130 and reporting that currently measured value to a remote location. The meter 130 includes an index that visually displays meter information indicating utility usage.

After being initialized, the meter reading device 110 reads the meter information from the meter 130 and transmits the current meter value to a central metering facility 140 using a transmitter 112. The transmitter 112 may be a wireless transmitter, as shown in the example of FIG. 1, or may include any other well-known means of communication, including wireless, optical or wired communication methods. The meter reading device 110 may be placed in proximity to the meter 130, or may be incorporated within the meter 130, and may accumulate pulses produced by meter 130 that indicate consumption as the provided utility commodity (e.g., gas, electricity, or water) flows through the meter 130. Alternatively, the meter reading device 110 may generate pulses by being physically coupled to the rotation of the proving hand of the meter 130.

The meter reading device 110 should be initialized prior to use. Initialization is performed to acquire the meter information from the meter 130, to determine an initial, current meter value, and forward the current meter value to the central metering facility 140. For example, the meter reading device 110 may be initialized upon initial installation, upon association of a new customer with the meter 130, or upon replacement of the meter reading device 110.

The initialization of the meter reading device 110 is based on an input of an initial meter value so that, thereafter, the amount of utility commodity consumed by the user may be indicated based on a measured usage amount after initialization. As described above, a conventional method of initializing the meter reading device 110 may require a field technician to manually read the initial meter value from the meter 130 and enter this value to the meter reading device 110.

In a non-limiting embodiment of the present invention, a field technician may use an initialization apparatus 120 to automatically read a current/initial value of the meter and transmit the initial meter value to the meter reading device 110 using a transmitter 126. For example, the initialization apparatus 120 may be part of a handheld device, such as a mobile telephone, personal digital assistant, tablet, or camera. The initialization apparatus 120 includes a camera 122, a processor 124, and a communication interface 126.

Figure 2:
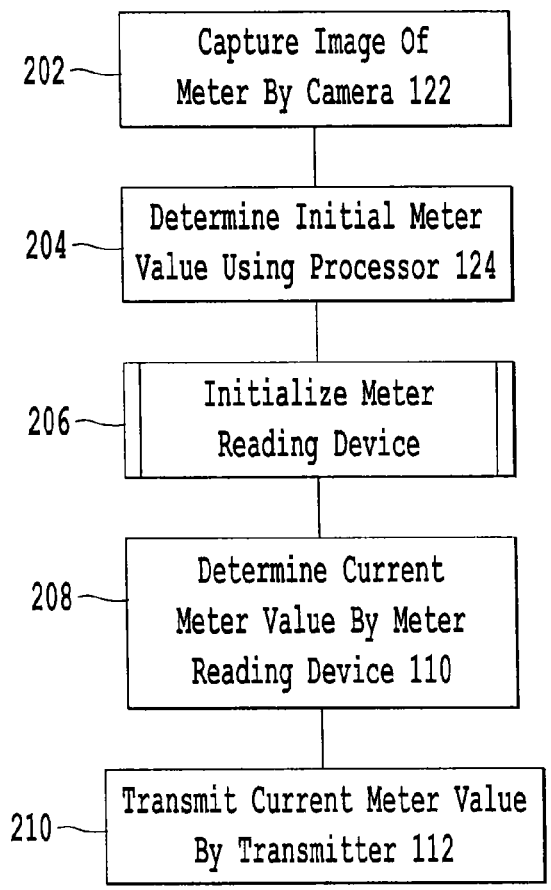
FIG. 2 is a flowchart of an exemplary method for initializing the meter reading device.

FIG. 2 is a flow diagram of an exemplary method 200 performed by the system shown in FIG. 1 during and after initialization of the meter reading device 110. To begin initializing the meter reading device 110, in step S202, the camera 122 of the initialization apparatus 120 captures an image of the meter 130. Specifically, the captured image includes the meter's displayed index, which may include dials and numbers indicating the current/initial meter value. Because the initialization apparatus 120 is handheld, it may be held by a field technician near the meter 130 to capture the meter's index. The initialization apparatus 120 may provide instructions or guidance to the field technician as to the requisite level of resolution, position, and/or focus of the captured image, either prior to or after the image is captured. For example, the initialization apparatus 120 may provide positioning, zoom, or focus aids prior to the image capture. Alternatively or additionally, after the image is captured, the initialization apparatus 120 may display a message advising the field technician whether or not the captured image meets the requirements and/or displaying the detected dials and values in the captured image. Optional Step S202 may require human intervention. Thereafter, all steps are performed automatically by the initialization apparatus 120 and/or the meter reading device 110, leading to increased speed, efficiency, and accuracy of the initialization process.

Once the image of the meter 130 is captured in step S202, the initialization apparatus 120 analyzes the captured image to determine the initial meter value in step S204. For example, the initialization apparatus 120 may determine the meter dial type and analyze the captured image to determine the initial meter value based on the appropriate dial type. Exemplary circular dial type and direct dial type indexes will be discussed with reference to FIGS. 4A and 4B. Step S202 requires no input or action from the field technician and is performed immediately after the image is captured in step S202.

After the initial meter value is determined in step S204, it is stored in the initialization apparatus 102 and used to initialize the meter reading device 110 in step S206 via communication link 126. Communication link 126 may include a wireless communication link, such as a BLUETOOTH or WIFI wireless communication link, or may include any known wireless, optical or wired communication link. The initialization of the meter reading device 110 will be discussed in greater detail with reference to FIG. 3. Once the meter reading device 110 is initialized, it operates thereafter to automatically track the current meter value and report the current meter value to the central metering facility 140 for billing. Again, the initialization of the meter reading device 110 and its subsequent operation occur automatically and without human input after the initial meter value is determined by the initialization apparatus 102.

Once the meter reading device 110 has been initialized in step S206, the meter reading device 110 operates by determining the current meter value of the meter continuously or at predetermined times in step S208. Step S208, which may be performed after some time has elapsed after the initialization of the meter reading device 110, or immediately following initialization, depending upon when the meter reading device 110 is required to report the meter value to the central metering facility 140. For example, step S208 may be performed at the end of the next billing cycle, if the meter reading device 110 is required to report the meter value at the end of each billing cycle. The meter reading device 110 acquires the current meter value by adding a measured usage amount since initialization to the initial meter value used to initialize the meter reading device 110, as discussed above.

Once the meter reading device 110 determines the current meter value in step S208, the meter reading device uses its transmitter 112 to transfer one or more values to the central metering facility 140 for billing in step S210. For example, the transferred value may be the current meter value, which is the initialization value plus usage measured since initialization. Additionally, the transferred values may include a history of meter values captured at fixed periods (for example, every hour) prior to the current reading. For efficiency, the historical values may be expressed as differences from an immediately preceding value. For example, if the current meter value is 1234, and the readings captured in the previous three hours, in reverse chronological order, were 1230, 1100, and 1050, the transferred values may be the current meter value (1234) and three difference values between the consecutive readings (4, 130, and 50).

The meter reading device 110 may transmit the current meter value over one of a cellular network, a satellite network, a proprietary network, or over the Internet. Step 210 may include an authentication procedure performed between the meter reading device 110 and the central metering facility 140. Additionally or alternatively, the current meter value may be encrypted by the meter reading device 110 prior to being sent. Steps S208 and S210 may be repeated after the meter reading device 110 has been initialized, each time the current meter value is to be reported by the meter reading device 110 to the central metering facility 140, for example each billing cycle.

Figure 3:
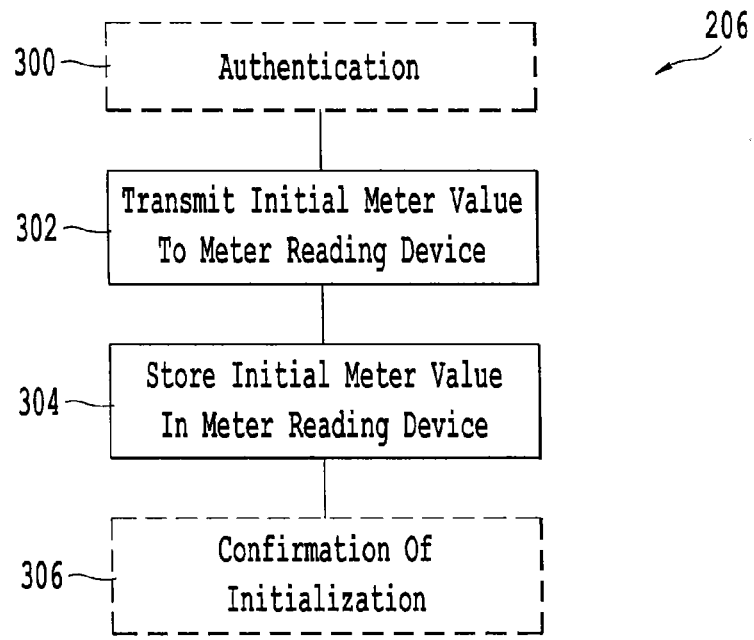
FIG. 3 is a flowchart showing additional detail of an exemplary method for initializing the meter reading device.

FIG. 3 shows an exemplary method performed by the system 100 for initializing the meter reading device in step S206. Steps S300 and S306, which are outlined in dashed lines, are optional. In step S300, the initialization apparatus 120 authenticates itself to the meter reading device 110 using the transmitter 126 in order to begin the initialization process. Then, in step S302, the initialization apparatus 120 transmits the initial meter value determined in step S204 to the meter reading device 110 using the transmitter 126. This transmission may be over a wired or a wireless link.

When the meter reading device 110 receives the initial meter value transmitted from the initialization apparatus 120 in step S302, the meter reading device 110 stores the initial meter value in step S304. Performance of step S304 completes the initialization of the meter reading device 110, allowing the meter reading device 110 to begin normal operation thereafter. Optionally, in step S306, the meter reading device 110 may transmit a confirmation of successful initialization to the initialization apparatus 120, which may display a confirmation to the field technician.

In an alternative embodiment of the present invention, the processor 124 is located in a dedicated process system external to the initialization apparatus 120. In this non-limiting alternative embodiment, upon capturing the image of the meter, the initialization apparatus 120 transmits the captured image to the external dedicated processing system. In the dedicated processing system, the processor 124, determines the initial meter value based on the captured image and transmits the determined initial meter value back to the initialization apparatus 120. Thereafter, the system functions as described above with respect to steps S206-S210 of FIG. 2. This alternative embodiment is advantageous in that it decreases the complexity of the initialization apparatus 120. Furthermore, the use of a dedicated processing system affords access to increased amounts of processing power and a large catalog of decoded images against which the captured image may be compared.

Figure 4A:
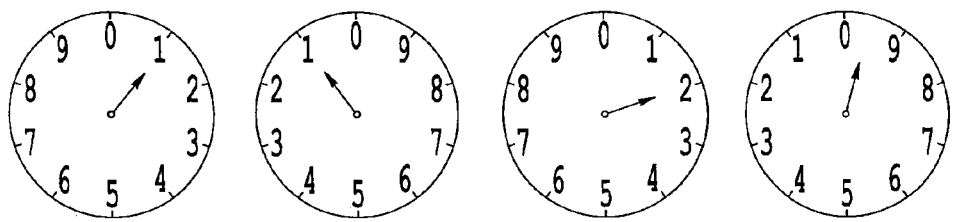
FIGS. 4A and 4B show exemplary styles of meters displaying meter information.
Figure 4B:
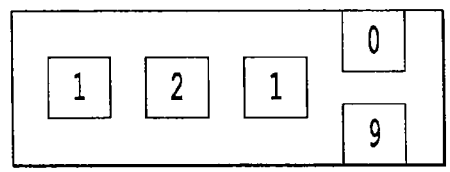

FIGS. 4A and 4B show exemplary styles of meter indexes displaying meter information. These are exemplary indexes captured in an image in step S202 by camera 122 of the initialization apparatus 120. FIG. 4A shows an example of a circular dial type index having a series of dials, each having a hand that points to the value of a corresponding digit of the meter value. The dials may be annotated with the digit for which they are providing the value. The unit in which the utility is being metered may also be printed on the face of the index. After an image of the circular dial type index is captured in step S202, the initialization apparatus 120 may analyze the captured image to determine the meter value indicated by the index. To do so, the initialization apparatus 120 may locate each dial, determine the orientation of the hand of each dial (i.e., clockwise or counterclockwise), determine the relevant units or other factors based on information displayed on the face of the meter, and determine the value shown by the hands of the dials.

FIG. 4B shows a direct dial type index, which includes a series of digits that rotate around a horizontal axis, similarly to an odometer in a motor vehicle. The unit in which the utility is being metered may also be printed on the face of the index. After an image of the direct dial type index is captured in step S202, the initialization apparatus 120 may recognize each digit to determine the value indicated by the index. In both the circular dial and direct dial types of indexes, the initialization apparatus 120 may detect a partial value, as shown in the far right digit of FIGS. 4A and 4B. The initialization apparatus 120 may include predetermined rules indicating how to handle a detected partial value (e.g., round up, or round down).

Figure 5:
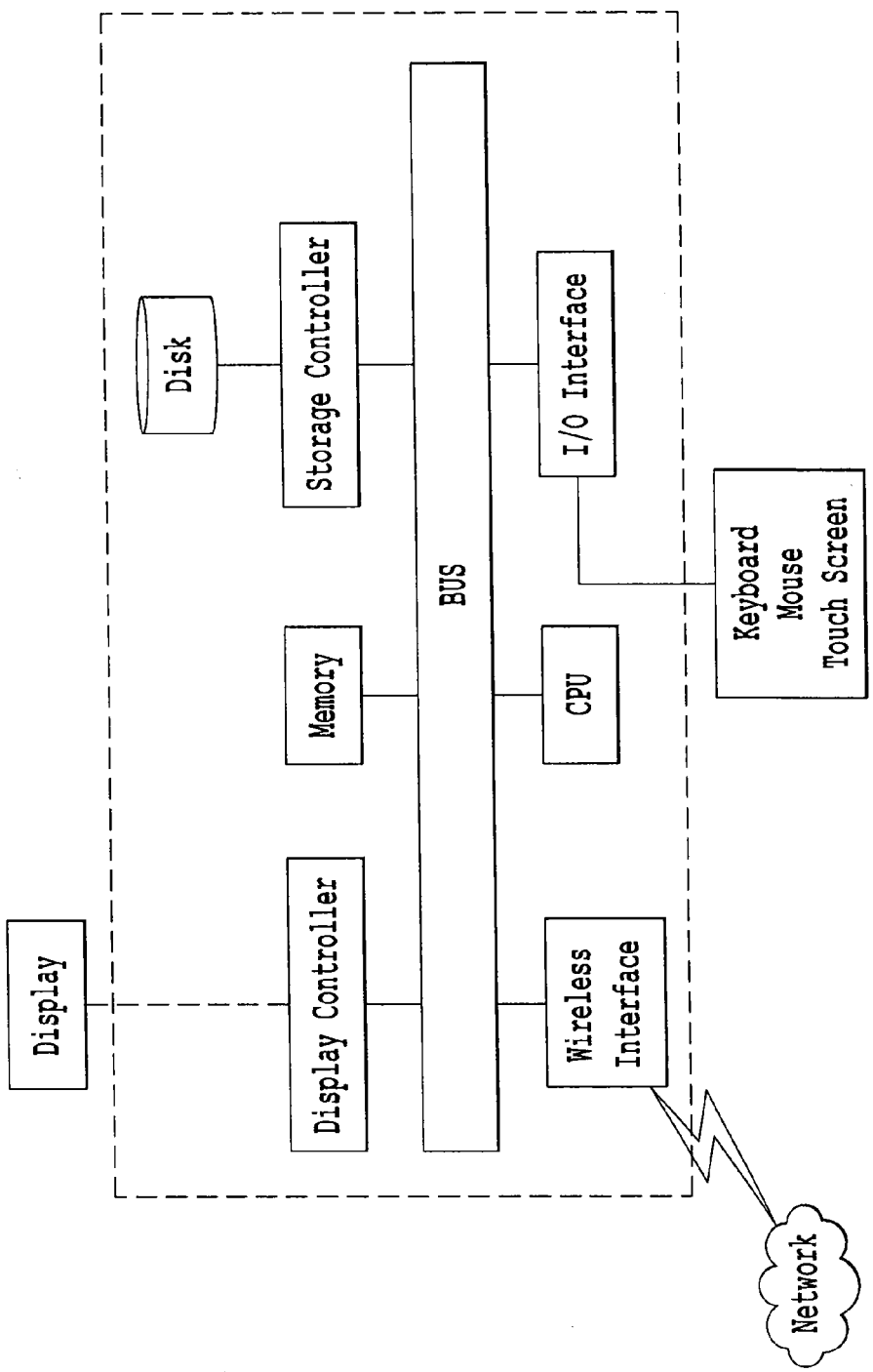
FIG. 5 is a block diagram of an exemplary embodiment of a processing system in an apparatus for initializing a meter reading device.

FIG. 5 illustrates an exemplary processing system or processor. One or more of such processing systems can be utilized in or to execute one or more algorithms, or portions thereof, or one or more architecture blocks, or portions thereof, in accordance with the descriptions provided herein. One or more of such processing systems can be included in the meter reading device 110 and initialization apparatus 120 described herein.

The exemplary processing system can be implemented using one or more microprocessors or the equivalent, such as a central processing unit (CPU) and/or at least one application specific processor (ASP). The processor is a circuit that utilizes a computer readable storage medium, such as a memory circuit (e.g., ROM, EPROM, EEPROM, flash memory, static memory, DRAM, SDRAM, and their equivalents), configured to control the processor to perform and/or control the processes and systems of this disclosure. Other storage mediums can be controlled via a controller, such as a disk controller, which can controls a hard disk drive or optical disk drive.

The processor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The processor can be a separate device or a single processing mechanism. Further, this disclosure can benefit from parallel processing capabilities of a multi-cored CPU. One or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. Additionally, an I/O (input/output) interface is provided for inputting signals and/or data from microphones, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive interface for providing a command/instruction interface.

The above-noted components can be coupled to a network, such as the Internet or a local intranet, via a network interface for the transmission or reception of data, including controllable parameters. A central BUS is provided to connect the above hardware components together and provides at least one path for digital communication there between.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes and complete executable programs. Moreover, parts of the processing of aspects of this disclosure may be distributed for better performance, reliability and/or cost.

The procedures and routines described herein can be embodied as a system, method or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. A method of initializing a meter reading device that measures consumption of a metered commodity and that communicates a current meter value of a meter associated with the metered commodity to a central metering facility, the method comprising:
   capturing meter information from the meter taken by a hand-held initialization apparatus;
   receiving, at the meter reading device based on the meter information taken by the hand-held initialization apparatus, an initial meter value of the meter;
   upon initial installation of the meter reading device, upon association of a new customer with the meter, or upon replacement of the meter reading device, initializing the meter reading device using the initial meter value obtained by the hand-held initialization apparatus;
   determining, by the meter reading device at a subsequent time after initializing the meter reading device, at least one of a) the current meter value and b) a measured consumption based on the initial meter value and the current meter value; and
   communicating the current meter value or the measured consumption to the central metering facility.

2. The method according to claim 1, wherein the capturing and the determining are performed by a portable device.

3. The method according to claim 2, wherein the initializing includes communicating the initial meter value from the portable device to the meter reading device via a wireless communication link.

4. The method according to claim 3, wherein the initializing includes storing the initial meter value communicated from the portable device in the meter reading device.

5. The method according to claim 4,
wherein the communicating includes communicating the current meter value from the meter reading device to the central metering facility via a wireless link.

6. An apparatus for initializing a meter reading device, the meter reading device configured to measure consumption of a metered commodity and to communicate a current meter value of a meter associated with the metered commodity to a central metering facility, the apparatus comprising:
a hand-held initialization apparatus comprising a camera configured to capture an optical image of the meter that displays meter information; and
a processor configured to
capture meter information from the meter taken by the hand-held initialization apparatus;
determine an initial meter value of the meter from the captured meter information taken by the hand-held initialization apparatus;
upon initial installation of the meter reading device, upon association of a new customer with the meter, or upon replacement of the meter reading device, provide the meter reading device the initial meter value obtained by the hand-held initialization apparatus, wherein
at a subsequent time after initializing the meter reading device and after having received from the hand-held initialization apparatus the initial meter value, the meter reading device is capable of
determining at least one of a) the current meter value and b) a measured consumption based on the initial meter value and current meter value, and
communicating the current meter value or the measured consumption to the central metering facility.

7. The apparatus according to claim 6, wherein the apparatus is a portable device.

8. The apparatus according to claim 7, wherein the processor is further configured to communicate the initial meter value to the meter reading device via a wireless communication link.

9. The apparatus according to claim 8, wherein the meter reading device stores the initial meter value communicated from the portable device.

10. The apparatus according to claim 9, wherein the meter reading device
communicates the current meter value to the central metering facility via a wireless link.

11. A system for initializing a meter reading device, the system comprising:
the meter reading device configured to measure consumption of a metered commodity and to communicate a current meter value of a meter associated with the metered commodity to a central metering facility; and
an initialization apparatus including
a camera configured to capture an optical image of the meter that displays meter information; and
a processor configured to
capture meter information from the meter taken by a hand-held initialization apparatus;
determine an initial meter value of the meter from the captured meter information taken by the hand-held initialization apparatus;
upon initial installation of the meter reading device, upon association of a new customer with the meter, or upon replacement of the meter reading device, provide the meter reading device the initial meter value obtained by the hand-held initialization apparatus
wherein
at a subsequent time after initializing the meter reading device and after having received from the hand-held initialization apparatus the initial meter value, the meter reading device is capable of
determining at least one of a) the current meter value and b) a measured consumption based on the initial meter value and current meter value, and
communicating the current meter value or the measured consumption to the central metering facility.

12. The system according to claim 11, wherein the initialization apparatus is a portable device.

13. The system according to claim 12, wherein the initialization apparatus is configured to communicate the initial meter value to the meter reading device via a wireless communication link.

14. The system according to claim 13, wherein the meter reading device is further configured to store the initial meter value communicated from the initialization apparatus.

15. The system according to claim 14, wherein the meter reading device is further configured to
communicate the current meter value to the central metering facility via a wireless link.

16. A non-transitory computer-readable storage medium storing computer-readable instructions thereon, which, when executed by a processing system cause the processing system to perform a method of initializing a meter reading device that measures consumption of a metered commodity and that communicates a current meter value of a meter associated with the metered commodity to a central metering facility, the method comprising:
capturing meter information from the meter taken by a hand-held initialization apparatus;
receiving, at the meter reading device based on the meter information taken by a hand-held initialization apparatus, an initial meter value of the meter;
upon initial installation of the meter reading device, upon association of a new customer with the meter, or upon replacement of the meter reading device, initializing the meter reading device using the initial meter value obtained by the hand-held initialization apparatus;
determining, by the meter reading device at a subsequent time after initializing the meter reading device, at least one of a) the current meter value and b) a measured consumption based on the initial meter value and the current meter value; and
communicating the current meter value or the measured consumption to the central metering facility.

17. The non-transitory computer-readable storage medium according to claim 16, wherein the capturing and the determining are performed using a portable device.

18. The non-transitory computer-readable storage medium according to claim 17, wherein the initializing includes communicating the initial meter value from the portable device to the meter reading device via a wireless link.

19. The non-transitory computer-readable storage medium according to claim 18, wherein the initializing includes storing the initial meter value communicated from the portable device in the meter reading device.

20. The non-transitory computer-readable storage medium according to claim 19,
wherein the communicating includes communicating the current meter value from the meter reading device to the central metering facility via a wireless link.

21. An apparatus for initializing a meter reading device, the meter reading device configured to measure consumption of a metered commodity and to communicate a current meter value of a meter associated with the metered commodity to a central metering facility, the apparatus comprising:
a hand-held initialization apparatus configured to capture meter information; and
a processor configured to
capture meter information from the meter taken by a hand-held initialization apparatus;
determine an initial meter value of the meter from the captured meter information taken by the hand-held initialization apparatus;
upon initial installation of the meter reading device, upon association of a new customer with the meter, or upon replacement of the meter reading device, provide the meter reading device the initial meter value obtained by the hand-held initialization apparatus
wherein
at a subsequent time after initializing the meter reading device and after having received from the hand-held initialization apparatus the initial meter value, the meter reading device is capable of
determining at least one of a) the current meter value and b) a measured consumption based on the initial meter value and current meter value, and
communicating the current meter value or the measured consumption to the central metering facility.

22. The apparatus according to claim 21, wherein the apparatus is a portable device.

23. The apparatus according to claim 22, wherein the processor is further configured to communicate the initial meter value to the meter reading device via a wireless communication link.

24. The apparatus according to claim 23, wherein the meter reading device stores the initial meter value communicated from the portable device.

25. The apparatus according to claim 24, wherein the meter reading device
communicates the current meter value to the central metering facility via a wireless link.

26. An apparatus for initializing a meter reading device, the meter reading device configured to measure consumption of a metered commodity and to communicate a current meter value of a meter associated with the metered commodity to a central metering facility, the apparatus comprising:
an initialization apparatus in communication with the meter reading device; and
a processor configured to
receive meter information taken by the initialization apparatus;
determine an initial meter value of the meter from the meter information taken by the initialization apparatus; and
upon initial installation of the meter reading device, upon association of a new customer with the meter, or upon replacement of the meter reading device, initialize the meter reading device using the initial meter value obtained by the initialization apparatus.

* * * * *